Figure 3:
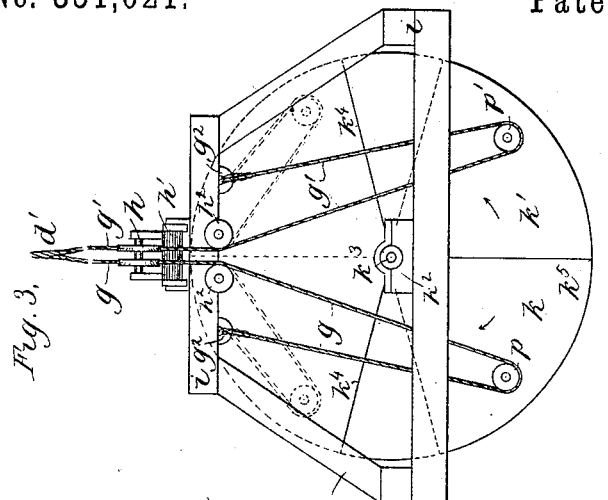

(No Model.) 2 Sheets—Sheet 1.
A. BETTELEY.
HOISTING AND CONVEYING APPARATUS.
No. 351,021. Patented Oct. 19, 1886.
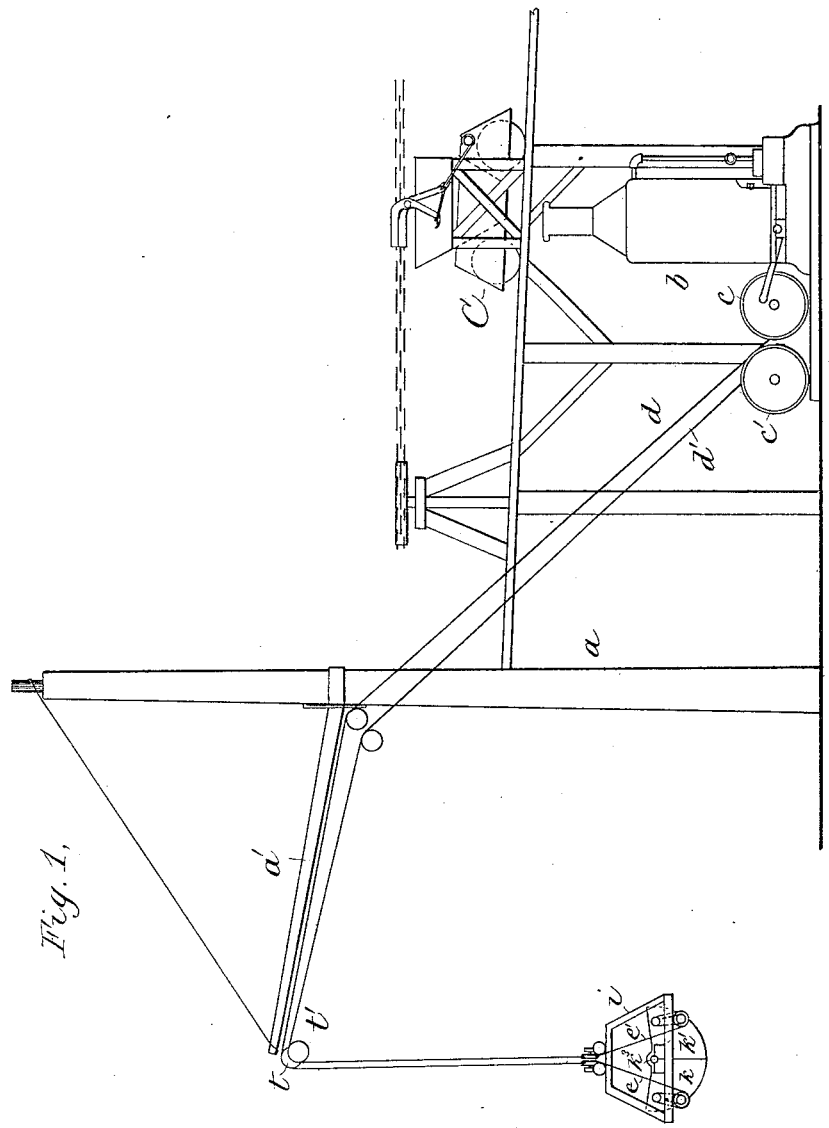

(No Model.) 2 Sheets—Sheet 2.

A. BETTELEY.
HOISTING AND CONVEYING APPARATUS.

No. 351,021. Patented Oct. 19, 1886.

Witnesses,
J. J. Maloney.
H. P. Batts.

Inventor,
Albert Betteley
by Jos. P. Livermore
Att'y.

UNITED STATES PATENT OFFICE.

ALBERT BETTELEY, OF BOSTON, MASSACHUSETTS.

HOISTING AND CONVEYING APPARATUS.

SPECIFICATION forming part of Letters Patent No. 351,021, dated October 19, 1886.

Application filed January 18, 1886. Serial No. 188,933. (No model.)

*To all whom it may concern:*

Be it known that I, ALBERT BETTELEY, of Boston, county of Suffolk, State of Massachusetts, have invented an Improvement in Hoisting and Conveying Apparatus, of which the following description, in connection with the accompanying drawings, is a specification, like letters on the drawings representing like parts.

My invention relates to a hoisting and conveying apparatus which may be employed for unloading coal or other commodities from vessels, or for conveying or transferring any material in bulk from one point to another. As now generally practiced, coal is unloaded or removed from vessels by means of buckets operated by a suitable derrick or hoisting apparatus, and the buckets have to be filled by hand-labor, and when hoisted and swung to the desired point by the boom of the derrick have to be emptied by one or more persons at the point where the bucket is to be emptied.

The present invention consists, mainly, in the novel construction of the bucket and actuating mechanism therefor, by which the bucket may be loaded and emptied by the same attendant that operates the hoisting-engine. In general construction the bucket is similar to those employed in dredging, and commonly known as a "clam-shell" bucket, consisting of two shells or half-buckets turning about a common axis, so that when in one position, or with the bucket open, they practically form a semi-cylinder having the convex part uppermost and its edges down, so that if the bucket is lowered in this position the edges, by the weight of the bucket, embed themselves in the mass of coal or other material to be raised, and then by turning the half-buckets or shells downward toward one another the edges will force their way through the material and come together, forming a half-cylinder with its open part uppermost, and containing a charge or load of the coal or other material to be raised.

The present invention consists, mainly, in novel appliances for opening and closing the bucket or changing the position of the shells, as described, the said mechanism being wholly outside the shells, and being operated by the ropes by which the bucket is hoisted and lowered. In other applications filed herewith, I have shown and described the mechanism for conveying the coal in bulk or causing it to flow, as it were, such mechanism being employed in connection with that herein shown for drawing the bulk of coal between the hatchways of a vessel to the point beneath the hatchway, so that the bucket of the present application is filled directly beneath the hatchways; and in another application I have shown apparatus for automatically conveying the coal in a horizontal direction, or down a slight grade, from the point at which it is discharged by the hoisting-bucket to any other desired point.

The three sets of apparatus—namely, for moving the material laterally in bulk to the position beneath the bucket, the bucket for raising the material from such point, and the apparatus for conveying the material thus raised by gravity to any other point—together form a complete apparatus for unloading coal or other cargoes from vessels with great rapidity and with the least possible amount of hand-labor, thus effecting a great saving in cost over the methods now used. The entire apparatus for hoisting the cargo out from the hold of a vessel may be placed upon a floating foundation, so that it may be used at different wharves at which there is not sufficient business to warrant providing the complete apparatus at each wharf.

Figure 2:
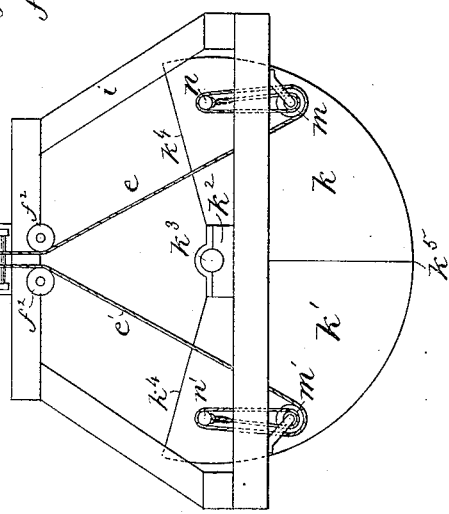

Figure 1 is a side elevation of a portion of the apparatus for hoisting and delivering coal or other material in accordance with this invention; Fig. 2, an end elevation of the bucket on a larger scale, showing the appliances by which the bucket is closed in the material and retained closed with its charge or load while being hoisted; Fig. 3, an elevation of the opposite end of the bucket, showing the appliances by which the bucket is opened in order to deliver its load or to enter the material for the purpose of receiving a new load; and Fig. 4, a side elevation of the bucket.

Figure 4:
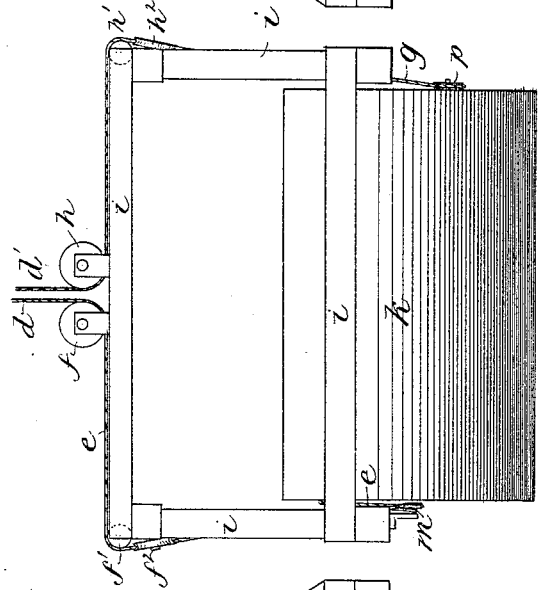

The derrick or crane comprising the mast $a$ and boom $a'$ (see Fig. 1) and the hoisting-engine $b$ may be of any suitable or usual construction, the said hoisting-engine having two winding-drums, $c\ c'$, either of which may be caused to turn in either direction or stop independently of the other by the attendant, such hoisting-engines being well known and not requiring detailed description, as of itself it forms no part of the present invention. Each of the said drums is provided with and controls the operation of a hoisting-rope, $d\ d'$, passing over suitable pulleys on the derrick to a point over the middle of the bucket, as best shown in Fig. 4, where each of the said ropes is divided into two branches, the branches $e\ e'$ of the rope $d$ passing over suitable pulleys, $f\ f'\ f^2$, to one end of the bucket frame-work, and the branches $g\ g'$ of the rope $d'$ passing over suitable pulleys, $h\ h'\ h^2$, to the other end of the bucket frame-work. (Shown in Fig. 3.) The frame-work $i$ of the bucket is of suitable shape to contain the shells $k\ k'$ of the bucket within it, and supports the bearings $k^2$ for the arbors $k^3$, upon which the shells $k\ k'$ turn.

The cords $e\ e'$, forming the continuation of the cord or rope $d$, which may be called the "bucket-closing rope," pass to either side of the bucket, where each one passes one or more times over a standing-block or series of sheaves, $m\ m'$, fixed with relation to the frame-work $i$, and over a corresponding block, $n\ n'$, fastened to the end plate or head of the corresponding half-bucket or shell, so that drawing on the rope $e$ tends to move the block $n$ toward the block $m$, and the simultaneous drawing on the rope $e'$ tends to move the block $n'$ toward the block $m'$, thus tending to rotate the half-buckets or shells about their arbor $k^3$ toward one another, so as to close the bucket. The pulleys $m\ n$ preferably multiply the power several times, so that the upward pull on the cord $d$ will first act to thus turn the shells $k\ k'$ toward one another without overcoming the weight of the entire apparatus, so that if the said shells are open or turned until their edges $k^4$ coincide on a vertical line, as shown in dotted lines, Fig. 3, and their edges $k^5$ are separated, and the entire apparatus rests with its weight on a mass of loose material, the first action on hoisting on the rope $d$ will be to draw the edges $k^5$ together without lifting the apparatus, so that the said edges will force their way down through the mass of material on which the bucket is resting. When, however, the edges $k^5$ of the bucket come together, the ropes $e\ e'$ can run no farther with relation to the bucket or its frame-work, so that further hoisting on the continuation $d$ of the said ropes will lift the bucket, at the same time retaining the shells in engagement with one another in the lowest position, so that the loaded bucket may be hoisted without danger of being discharged by the opening of the bucket before the time intended.

As the ropes $d\ d'$ both run to a point practically over the middle of the bucket, either one alone may be depended upon to sustain the weight of and raise or lower the bucket; but in the operation of closing the bucket, as just described, by hoisting on the rope $d$, the rope $d'$ will first be left slack, and then after the rope $d$ has been operated to close the bucket and begins to hoist the same the rope $d'$ will also be wound upon its drum, and may, if desired, be caused to take a part of the load in the operation of hoisting the bucket. After the bucket has been hoisted to the desired level, and then brought to the desired position in the horizontal plane at that level by swinging the boom $a'$ in the usual manner—as, for instance, to place it over the car C, Fig. 1—the bucket is opened by taking up the rope $d'$ (see Fig. 4) relatively to the rope $d$, either hoisting on the former without taking up the latter or slackening the latter rope, $d$, without slackening the rope $d'$. This operation leaves the weight of the car suspended on the rope $d'$, the branches $g\ g'$ of which are fastened at $g^2$ on the frame-work after having passed around pulleys $p\ p'$ on the half-buckets $k\ k'$, in such manner that the tension on the ropes $g\ g'$, or the pull of the bight of the said ropes over the pulleys $p\ p'$, tends to turn the half-buckets $k\ k'$ in the direction of the arrows, Fig. 3, or, in other words, to open the buckets, this movement being no longer resisted by the tension of the ropes $e\ e'$ at the other end of the bucket, as the said ropes have been slackened.

The power tending to move the half-buckets from the closed to the open position is shown in Fig. 3 as twofold or twice the tension on the cords $g\ g'$ derived from the weight of the bucket, and this multiplication of power is preferably less than that of the closing-rope $d$ and its branches $e\ e'$, (shown in Fig. 2,) so that when both ropes $d\ d'$ are being wound together and uniformly after the buckets have been closed there will be no danger of the bucket opening, even if the load is divided between the two cords, and it is not until the rope $d$ is slackened or paid out for a considerable length with relation to the rope $d'$ that the bucket will open. After the bucket has been opened, permitting its contents to discharge into the car C, or other receptacle intended to receive it, the bucket is again turned on the boom $a'$ to the proper position to receive another load, and lowered by paying out both ropes $d\ d'$ equally, while the weight of the bucket still remains suspended mainly on the rope $d'$; and after the bucket has descended upon the pile of material to be raised the rope $d'$ is slackened sufficiently to permit the half-buckets to close without producing any tension on the said rope, and the rope $d$ is taken up, causing the half-buckets to close together by a downward movement through the material, as before described.

The frame-work at the ends of the bucket will preferably be covered by sheathing, which will inclose the ropes and pulleys, so that they will not be injured by contact with the material that is being operated upon.

The ropes $d\ d'$ are slightly separated at the middle of the bucket, and by placing the pulleys $t\ t'$, over which they run, at the end of the boom $a'$, a short distance apart, the bucket will be prevented from twisting or causing the ropes $d\ d'$ to become foul with one another, and also causing the bucket to rise and fall in the same position, so that it will pass squarely through the hatchway of the vessel if the load is being taken from the vessel.

I claim—

1. In a hoisting apparatus, a bucket consisting of two pivoted shells, combined with a supporting-frame wholly outside the said shells, and two hoisting-ropes, one passing to either end of the said frame, and pulleys connected with the said frame and with the shells at either end thereof, co-operating with the said ropes, as described, whereby a force applied to one of the said ropes tends with increased power to close the bucket into the material to be hoisted, and power applied to the other rope tends to open the bucket, substantially as described.

2. The bucket-supporting frame and hinged shells or half-buckets supported thereon, combined with the hoisting and bucket-closing rope, having two branches and guide-pulleys therefor, whereby it is guided from a point over the middle of the frame to one end thereof, and pulleys connected with the frame and with the ends of the shells, over which the said branches of the closing-rope pass, whereby a force applied to the said rope tends with increased power to close the said half-buckets downward into the material to be hoisted, substantially as described.

In testimony whereof I have signed my name to this specification in the presence of two subscribing witnesses.

ALBERT BETTELEY.

Witnesses:
JOS. P. LIVERMORE,
JAS. J. MALONEY.